United States Patent
Johnson et al.

(10) Patent No.: US 10,641,493 B2
(45) Date of Patent: *May 5, 2020

(54) AERODYNAMIC FASTENING OF TURBOMACHINE FUEL INJECTORS

(71) Applicant: General Electric Company, Schenectady, NY (US)

(72) Inventors: Thomas Edward Johnson, Greer, SC (US); Kaitlin Marie Graham, Greenville, SC (US); Geoffrey David Myers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 15/626,783

(22) Filed: Jun. 19, 2017

(65) Prior Publication Data
US 2018/0363909 A1 Dec. 20, 2018

(51) Int. Cl.
*F23R 3/28* (2006.01)
*F02C 9/26* (2006.01)
(Continued)

(52) U.S. Cl.
CPC ............... *F23R 3/286* (2013.01); *F02C 9/26* (2013.01); *F02M 61/14* (2013.01); *F02M 61/18* (2013.01);
(Continued)

(58) Field of Classification Search
CPC ............ F23R 3/283; F23R 3/286; F23R 2900/00012; F23D 11/38; F23D 11/383; F02M 61/14; F02M 61/18; F02C 9/26
See application file for complete search history.

(56) References Cited

U.S. PATENT DOCUMENTS

| 3,053,312 A | 9/1962 | Villoresi |
| 4,898,329 A * | 2/1990 | Davis ............... F23R 3/283 239/13 |

(Continued)

FOREIGN PATENT DOCUMENTS

| GB | 218509 A | 7/1987 |
| WO | WO94/08178 A1 | 4/1994 |

(Continued)

OTHER PUBLICATIONS

U.S. Appl. No. 14/669,131, filed Mar. 26, 2015.

*Primary Examiner* — Arun Goyal
*Assistant Examiner* — Colin J Paulauskas
(74) *Attorney, Agent, or Firm* — Dority & Manning, P.A.

(57) ABSTRACT

A premixing fuel nozzle assembly for a turbomachine is disclosed as having at least one fuel injector with an outer jacket having a first end and a second end and a threaded surface disposed therebetween. The first end has a cylindrical sealing surface and the second end has at least one wrenching pocket. An annular hub is disclosed as having an aperture with a first end and a second end and a threaded surface disposed therebetween, wherein the aperture is configured to at least partially house the fuel injector therein and the annular hub further has a conical seat about the first end. The fuel injector cylindrical sealing surface swages inward to form a hermetic seal when contacting the annular hub conical seat as the fuel injector is threaded into the aperture.

16 Claims, 7 Drawing Sheets

(51) Int. Cl.
*F02M 61/14* (2006.01)
*F02M 61/18* (2006.01)
*F23D 11/38* (2006.01)
*F23R 3/36* (2006.01)

(52) U.S. Cl.
CPC ............ *F23D 11/38* (2013.01); *F23D 11/383* (2013.01); *F23R 3/283* (2013.01); *F23R 3/36* (2013.01); *F23R 2900/00012* (2013.01)

(56) References Cited

U.S. PATENT DOCUMENTS

| | | |
|---|---|---|
| 5,067,657 A | 11/1991 | Young et al. |
| 5,096,124 A | 3/1992 | Young |
| 5,219,456 A | 6/1993 | Theriot |
| 5,487,659 A | 1/1996 | Eroglu et al. |
| 5,636,980 A | 6/1997 | Young et al. |
| 5,813,847 A | 9/1998 | Eroglu et al. |
| 5,934,555 A | 8/1999 | Dobbeling et al. |
| 5,993,196 A | 11/1999 | Young et al. |
| 6,857,271 B2 | 2/2005 | Kraft et al. |
| 7,320,440 B2 | 1/2008 | Prociw et al. |
| 8,663,348 B2 | 3/2014 | Sprouse et al. |
| 8,721,747 B2 | 5/2014 | Sprouse et al. |
| 2005/0167530 A1 | 8/2005 | Ward et al. |
| 2011/0073071 A1* | 3/2011 | Smith ............... F02M 61/08 123/445 |
| 2013/0205789 A1 | 8/2013 | Johnston et al. |
| 2016/0169110 A1* | 6/2016 | Myers ............... F02C 7/222 60/776 |
| 2016/0281989 A1 | 9/2016 | Johnson et al. |

FOREIGN PATENT DOCUMENTS

| | | |
|---|---|---|
| WO | WO2006/081676 A1 | 8/2006 |
| WO | WO2012/021709 A1 | 2/2012 |

\* cited by examiner

AERODYNAMIC FASTENING OF TURBOMACHINE FUEL INJECTORS

FIELD OF THE DISCLOSURE

The disclosure relates generally to turbomachines, and more specifically to combustor premixers having aerodynamically fastened fuel injectors.

BACKGROUND OF THE DISCLOSURE

Gas turbines generally operate by combusting a fuel and air mixture in one or more combustors to create a high-energy combustion gas that passes through a turbine, thereby causing a turbine rotor shaft to rotate. The rotational energy of the rotor shaft may be converted to electrical energy via a generator coupled to the rotor shaft. Each combustor generally includes fuel nozzles that provide for delivery of the fuel and air upstream of a combustion zone, using premixing of the fuel and air as a means to keep nitrogen oxide (NOx) emissions low.

Gaseous fuels, such as natural gas, often are employed as a combustible fluid in gas turbine engines used to generate electricity. In some instances, it may be desirable for the combustion system to be able to combust liquid fuels, such as distillate oil. In a typical configuration, liquid fuel injection may be provided via a cartridge that extends within a center body of the fuel nozzle. Typical liquid cartridges have atomizing nozzles that are formed within the cartridge, making maintenance (e.g., cleaning) and replacement of the nozzles impractical and difficult.

BRIEF DESCRIPTION OF THE DISCLOSURE

Aspects and advantages of the disclosure will be set forth in part in the following description, or may be obvious from the description, or may be learned through practice of the disclosure.

An exemplary embodiment can be a premixing fuel nozzle assembly for a turbomachine having at least one fuel injector with an outer jacket having a first end and a second end and a threaded surface disposed therebetween. The first end has a cylindrical sealing surface and the second end has at least one wrenching pocket. An annular hub is disclosed as having an aperture with a first end and a second end and a threaded surface disposed therebetween, wherein the aperture is configured to at least partially house the fuel injector therein and the annular hub further has a conical seat about the first end. The fuel injector cylindrical sealing surface swages inward to form a hermetic seal when contacting the annular hub conical seat as the fuel injector is threaded into the aperture.

Another embodiment can be a turbomachine with a compressor and a combustor in communication with the compressor, wherein the combustor has at least one premixing fuel nozzle assembly as described above.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
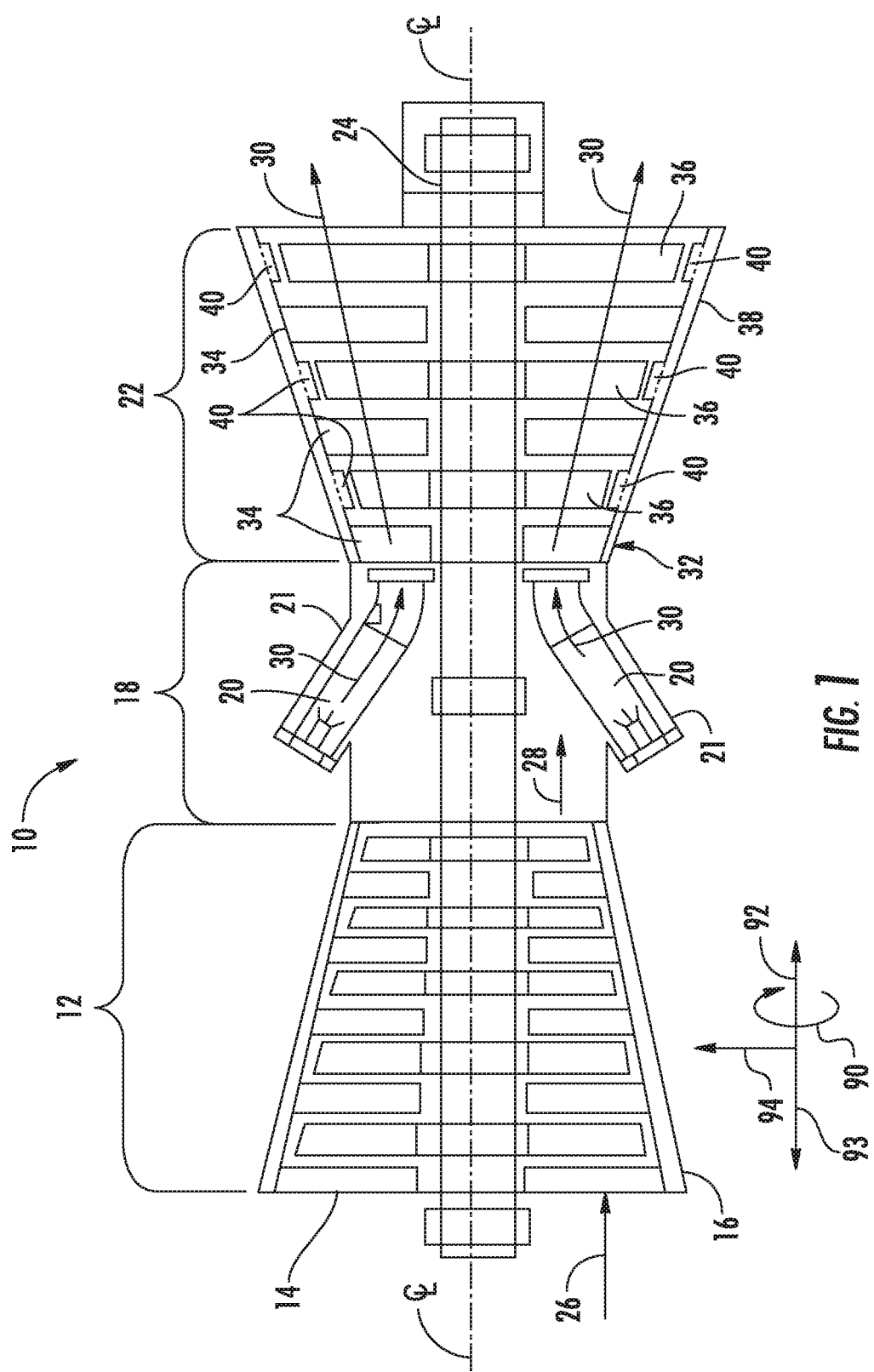
FIG. 1 is a schematic of an exemplary turbomachine such as a gas turbine.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine including but not limited to an aero-derivative turbine, marine gas turbine as well as an aero engine turbine, unless specifically recited in the claims.

Conventional gas turbine liquid fuel systems use an independent breech loaded liquid injector design that is generally assembled after the nozzles have been fixed to the end cover allowing the injector to move freely at the aft end. Due to this movement, the component is prone to wear during normal operating conditions and can cause failure before the combustion interval is reached.

Figure 3:
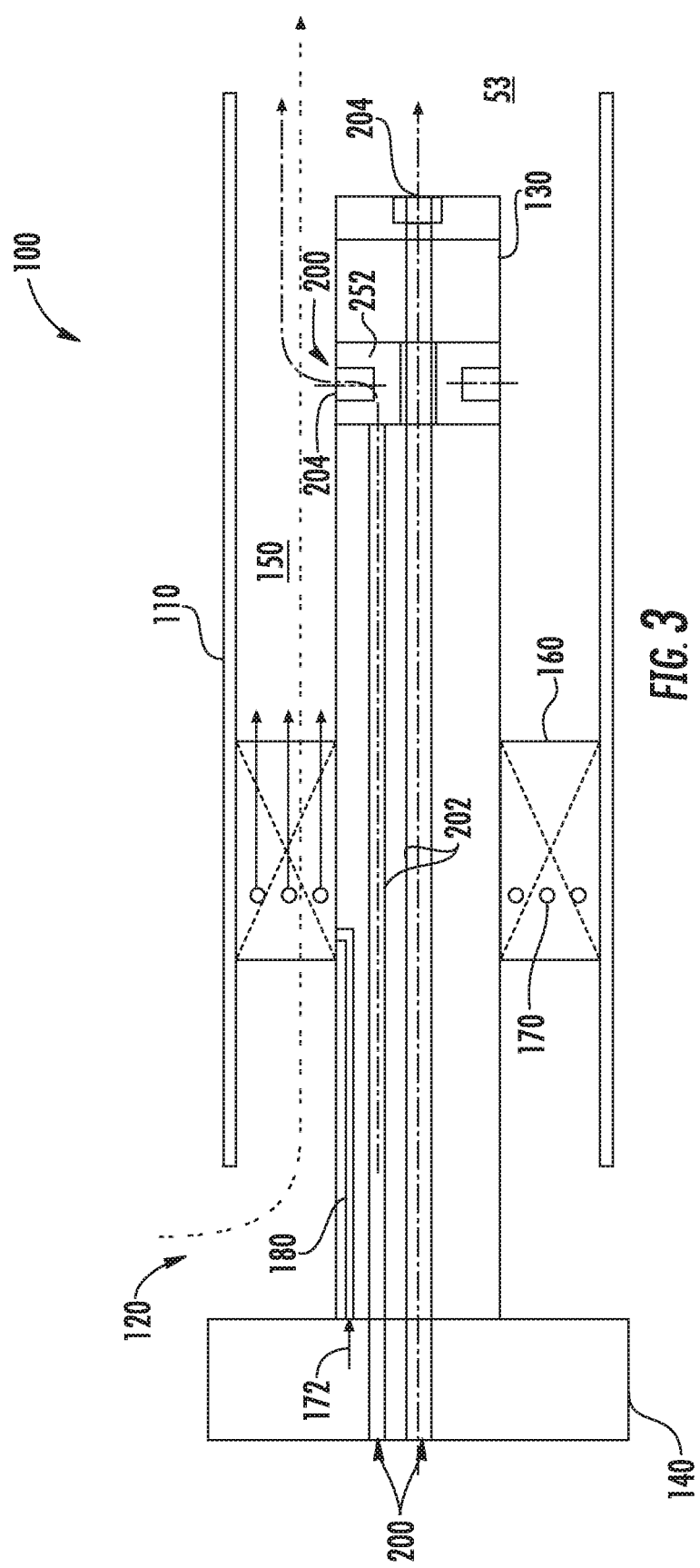
FIG. 3 is a schematic of a premixer nozzle assembly according to aspects of exemplary embodiments.

The liquid fuel injector disclosed herein can be installed in either a radial position around a fuel nozzle hub or in an axial position at the end of the fuel nozzle, thereby avoiding a conventional breech loaded design. The injector can be threaded into the assembly using a specific service tool. The injector can have a metal-to-metal seal such that as the injector is internally pressurized, the injector walls are pressed to support the seal. In the event that liquid fuel injector or liquid fuel circuit needs service, the injector can be removed with a service tool and replaced, or the circuit can be cleaned free of any blockages in the flow path, without the removal of the fuel nozzle from its upper level assembly. The threaded coupling between the liquid fuel injector and a hub, combined with the specific tooling features, allows the injectors to be removed without disassembling the entire head end. The dual-fuel nozzle design, pictured in FIG. 3, shows a fully integrated gas and liquid fuel distribution system having a simplified upper level assembly in addition to having less risk of wear and fuel leakage during operation.

Referring now to the drawings, wherein like numerals refer to like components, FIG. 1 illustrates an example of a turbomachine 10, such as a gas turbine, as may incorporate various embodiments of the present invention. Directional orientation, consistent in all figures, is defined as circumferential direction 90, downstream axial direction 92, upstream axial direction 93, and radial direction 94. As shown, the turbomachine 10 generally includes a compressor section 12 having an inlet 14 disposed at an upstream end of the turbomachine 10, and a casing 16 that at least partially surrounds the compressor section 12. The turbomachine 10 further includes a combustion section 18 having at least one combustor 20 downstream from the compressor section 12, a compressor discharge casing 21 at least partially surrounding the combustion section 18, and a turbine section 22 positioned downstream from the combustion section 18. As shown, the combustion section 18 may include a plurality of the combustors 20. A shaft 24 extends axially through the turbomachine 10.

In operation, air 26 is drawn into the inlet 14 of the compressor section 12 and is progressively compressed to provide a compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. A turbine casing 38 at least partially encases the rotor blades 36 and the turbine nozzles 34. Each or some of the rows of rotor blades 36 may be circumferentially surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the turbomachine.

Figure 2:
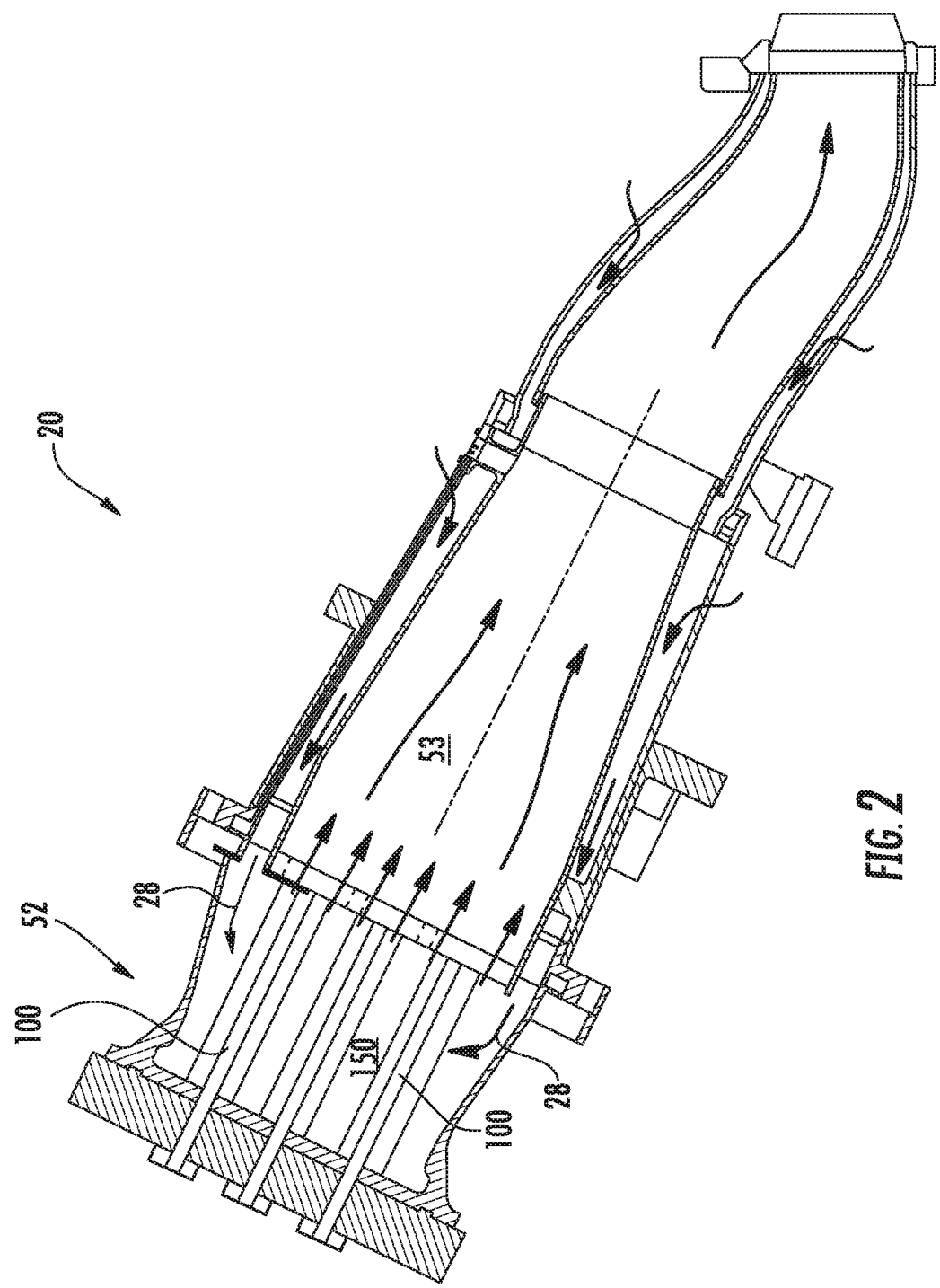
FIG. 2 is a side view of a combustor having a premixer fuel nozzle assembly according to aspects of exemplary embodiments.

FIG. 2 is a side view of an exemplary combustor 20 having a premixer fuel head assembly 52 with at least one premixing fuel nozzle 100 according to aspects of exemplary embodiments. As shown in FIG. 2, the fuel head assembly 52 is where premixing of fuel and air is performed in the premixing chamber 150 by the premixing fuel nozzles 100. FIG. 3 shows an example of a premixing fuel nozzle 100 as described herein. The premixing fuel nozzle 100 may be used with the combustor 20 and the like. The combustor 20 may use any number of the premixing fuel nozzles 100 in any configuration. The premixing fuel nozzle 100 may include an outer annular shroud 110. The outer annular shroud 110 may extend from an air inlet 120 on an upstream end thereof and may end about the combustion zone 53 at a downstream end thereof. The outer annular shroud 110 may surround an inner annular wall or a hub 130. The hub 130 may extend from a gas fuel nozzle flange 140 at the upstream end thereof and may end upstream of the end of the outer annular shroud 110. The outer annular shroud 110 and the hub 130 may define a premixing chamber 150 therebetween. The premixing chamber 150 may be in communication with a flow of compressed air 28 (see FIGS. 1 and 2) from the compressor 12 or elsewhere. A number of swirler vanes 160 also may extend from the hub 130 to or about the outer annular shroud 110. The swirler vanes 160 may have any suitable size, shape, or configuration. A number of fuel injection ports 170 may be positioned about the swirler vanes 160. The fuel injection ports 170 may be in communication with a flow of fuel 172. The swirler vanes 160 with the injection ports 170 thus provide fuel/air mixing and premixed flame stabilization. In this example, the flow fuel 172 may be a flow of natural gas. Other types of fuels may be used herein. The flow of compressed air 28 and the flow of fuel 172 may begin to mix within the premixing chamber 150 and swirler vanes 160 and flow into the combustion zone 53. Other components and other configurations may be used herein.

The premixing fuel nozzle 100 also may include a number of concentric tubes defining discrete annular passages for the flow of different types of fluids. The concentric tubes may have any suitable size, shape, or configuration. A gas passage 180 for a flow of a primary fuel such as natural gas may extend from the gas fuel nozzle flange 140 to the fuel injection ports 170 about the swirler vanes 160. In use, the premixing fuel nozzle 100 mixes a flow of the fuel 172 such as natural gas via the gas passage 180 and the fuel injection ports 170 of the swirler vanes 160 with a flow of compressed air 28 from the compressor 12 or otherwise via the air inlet 120. The flows may be swirled downstream of the swirler vanes 160 and mixed within the premixing chamber 150 before ignition within the combustion zone 53.

The premixing fuel nozzle 100 also may include a liquid fuel system 200. The liquid fuel system 200 may provide a flow of a secondary fuel such as a distillate, biodiesel, ethanol, and the like. The liquid fuel system 200 may include a liquid fuel passage 202. The liquid fuel passage 202 may extend from the gas fuel nozzle flange 140 to a number of liquid fuel injectors 204 positioned radially or axially. The liquid fuel injectors 204 may be aligned in a single plane as is shown and/or the injectors 204 may be in a staggered configuration. Any number of liquid fuel injectors 204 may be used. In some instances, the liquid fuel injectors 204 may be atomizing liquid fuel injectors, plain jet injectors, and/or simple orifice injectors. Other types of fuel injectors may be used herein. Any type or combination of liquid fuel injectors may be used herein.

Figure 4:
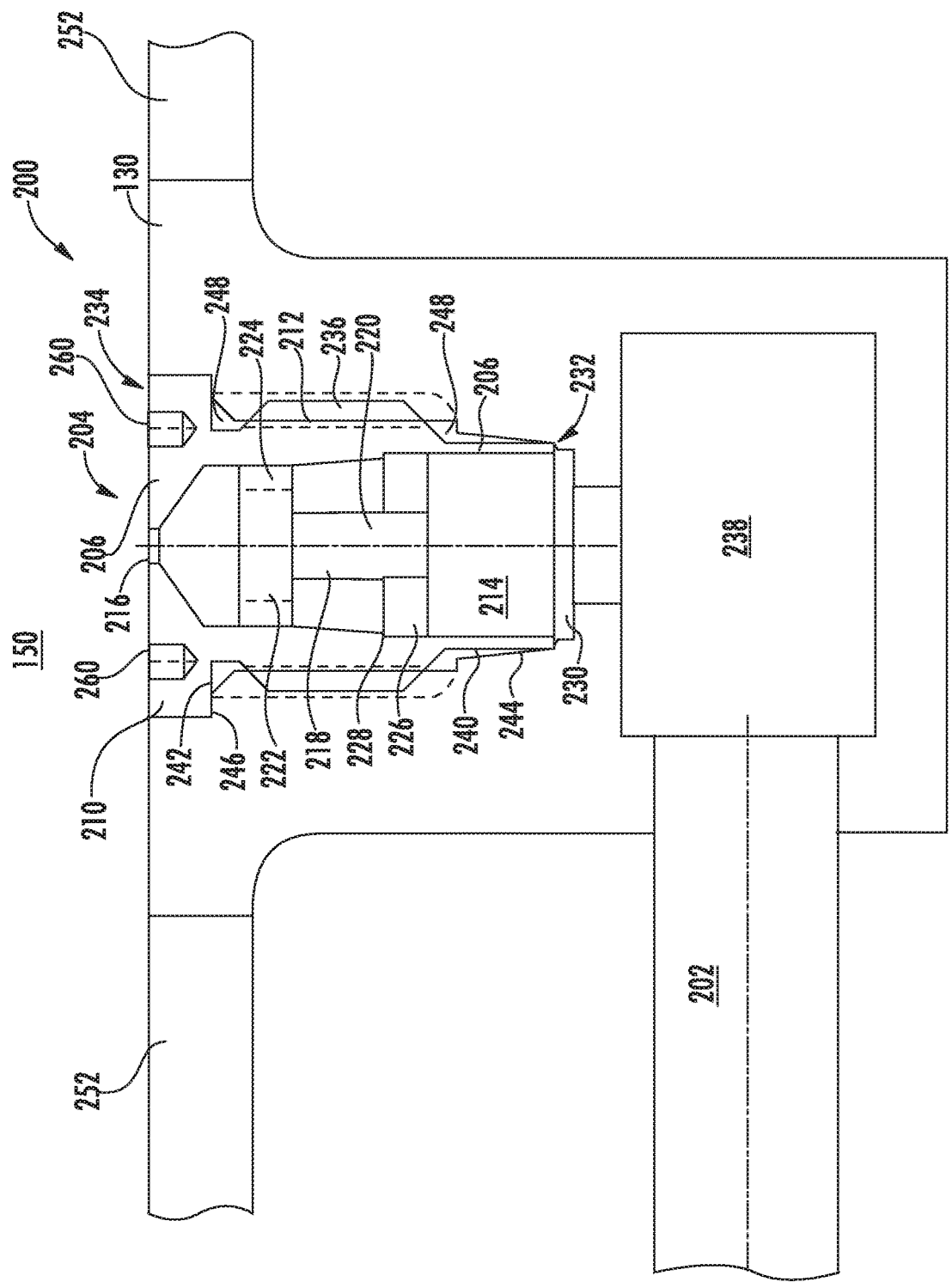
FIG. 4 is a section view of an exemplary premixer nozzle assembly in a liquid fuel injector manifold assembly.
Figure 5:
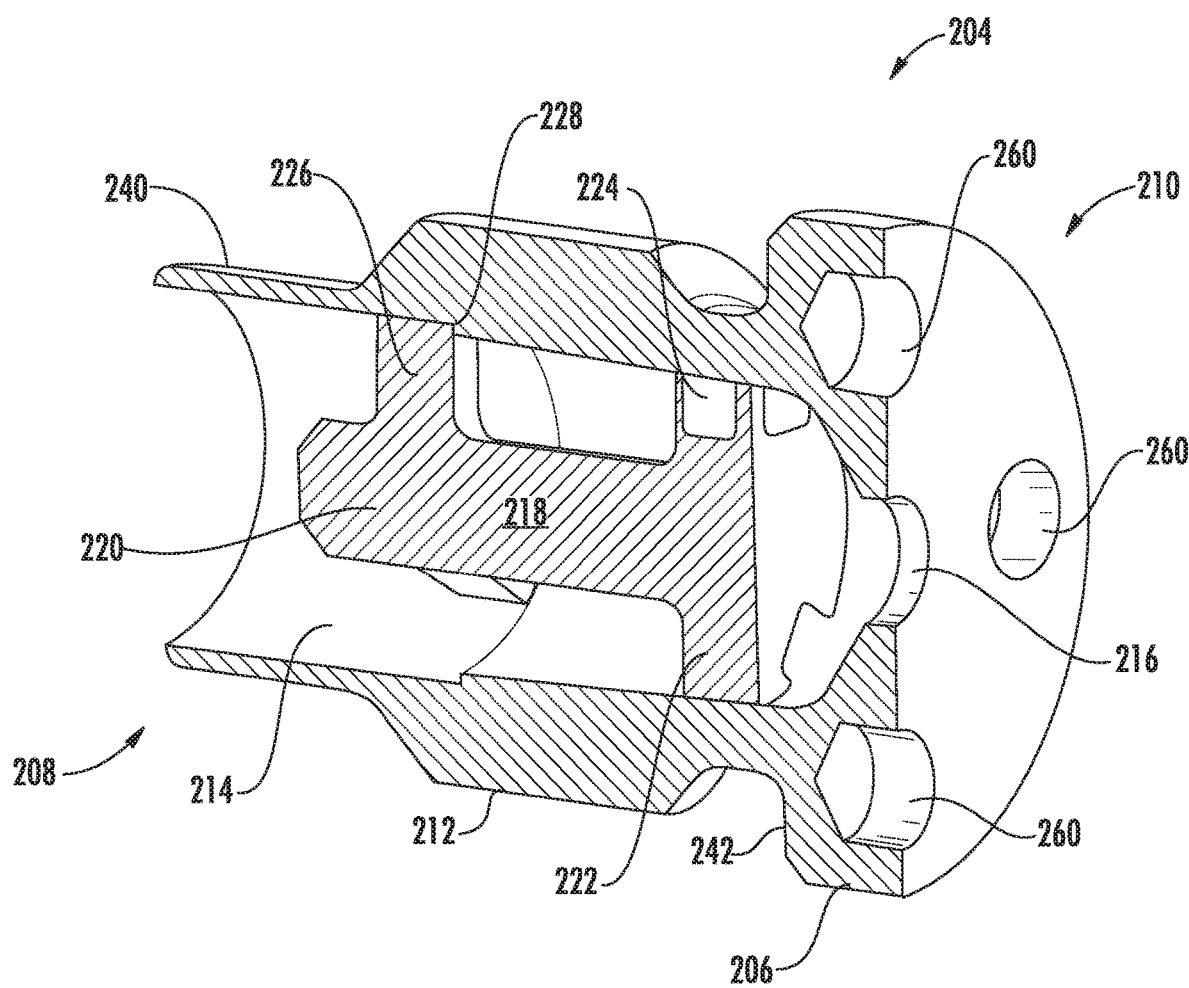
FIG. 5 is a perspective view of an exemplary liquid fuel injector.
Figure 6:
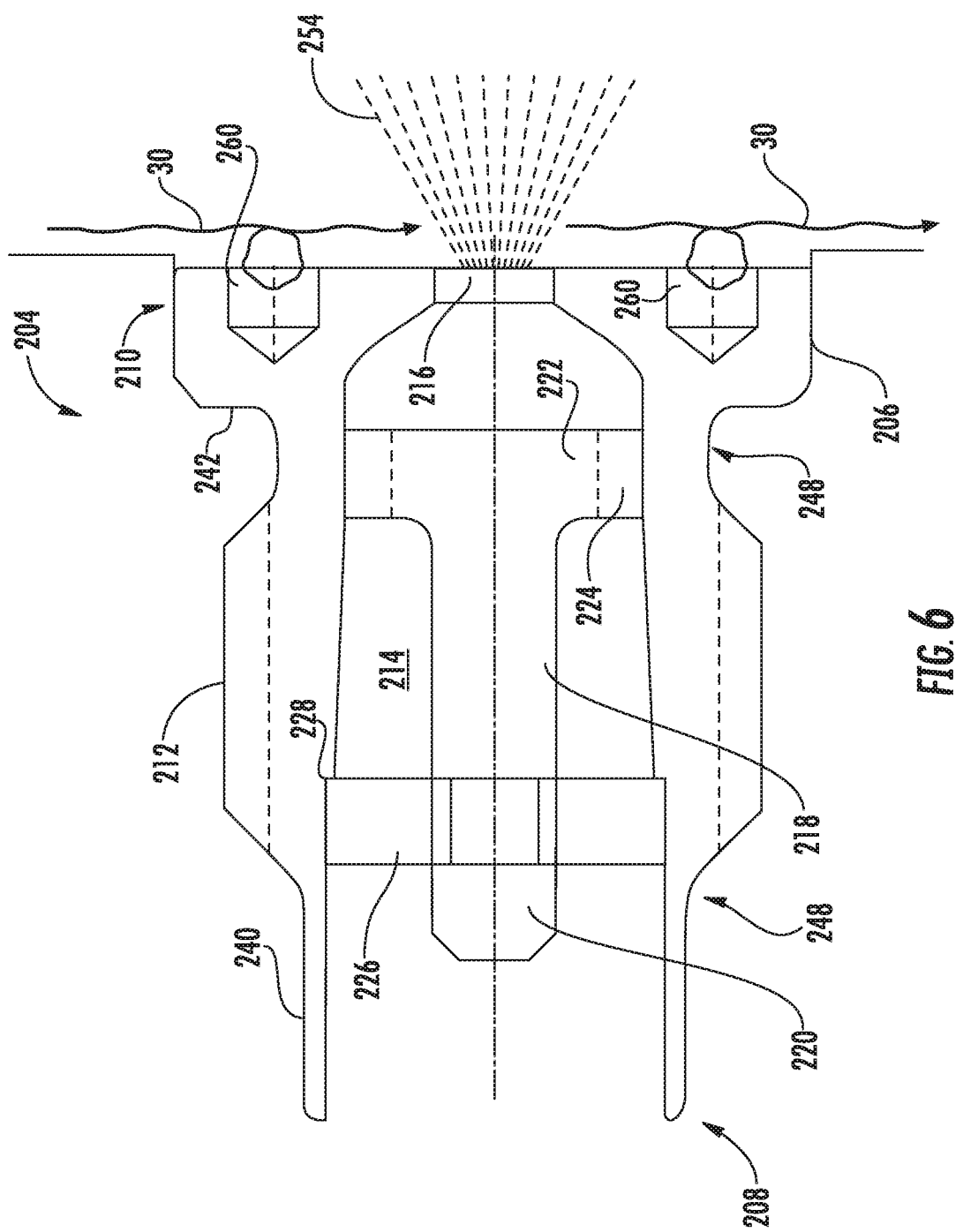
FIG. 6 is a side view of an exemplary liquid fuel injector.

As depicted in FIGS. 4-6, the liquid fuel injectors 204 may be atomizing liquid fuel injectors. For example, each of the liquid fuel injectors 204 may include an outer jacket 206 having a first end 208 and a second end 210 with a threaded surface 212 disposed therebetween. The outer jacket 206 may include an internal passageway 214 between the first end 208 and the second end 210. The internal passageway 214 may be in communication with an orifice 216 disposed about the second end 210. In some instances, the orifice 216 may be narrower than the internal passage 214.

A swirler 218 may be disposed within the internal passage 214. The swirler 218 may include a lower stem 220 leading to an upper flange 222. The upper flange 222 may include a number of slots 224 positioned therein. In some instances, the slots 224 may be angled. Any number of slots 224 may be used. In addition, a number of struts 226 may extend from the lower flange 220 to the surface of the internal passageway 214. In some instances, a lip 228 formed within the internal passageway 214 may be configured to abut or mate with the struts 226. Any type of swirler may be used herein.

The hub 130 may include an aperture 230 having a first end 232 and a second end 234 with a threaded surface 236 disposed therebetween. The aperture 230 may be configured to at least partially house the liquid fuel injector 204 therein. The aperture 230 may be in communication with the liquid fuel passage 202. In some instances, the liquid fuel passage 202 may include a fuel plenum 238.

The flow of a liquid fuel thus may flow through the liquid fuel passages 202. The liquid fuel may be accelerated as it flows through the slots 224 of the upper flange 222 of the inner swirler 218. The flow then again may be accelerated as it passes through the narrow orifice 216 and atomized into an atomized spray 254 as it enters the premixing chamber 150 for mixing with the flow of compressed air 28 therein. In some instances, the liquid fuel injectors 204 may be mounted about the hub 130 downstream of the swirler vanes 160 so as to avoid impairing the aerodynamics of the overall premixing fuel nozzle 100 or impairing the operability and/or emission compliance when operating on a gas fuel by distorting the gas fuel/air mixture profile. Additionally, at least one wrenching pocket 260 is positioned on the second end 210 of the liquid fuel injector 204 outer jacket 206 to enable installation and removal of the liquid fuel injector 204 in the liquid fuel injector manifold assembly 252. The wrenching pockets 260 are positioned and shaped to minimize flow disturbance of the premixing fuel in the premixing chamber 150. The wrenching pockets 260 can be configured in the outer jacket 206 of the liquid fuel injector 204. The wrenching pockets 260 can be in fluid communication with the premixing chamber 150 and in contact with the flow path of the premixed fuel. The wrenching pockets 260 can generally be recessed in the face of the outer jacket 206 that is in contact with the premixed fuel and can be shaped as a cylindrical bore thereby minimizing recirculation zones and thus preventing flame holding. The size, location and count of the wrenching pockets 260 can be varied within the geometrical constraints of the liquid fuel injector 204. Also, the shape of the wrenching pockets 260 can vary, for instance, a recessed cylindrical bore, a recessed oval bore, a recessed square bore, and mixtures thereof can be used. The cylindrical bore of the wrenching pockets 260 can be flush with the face of the outer jacket 206 that is in contact with the premixed fuel flow path and are small enough not to cause a significant forward or backward facing step. The step can generally be less than 0.005 inches.

Figure 7:
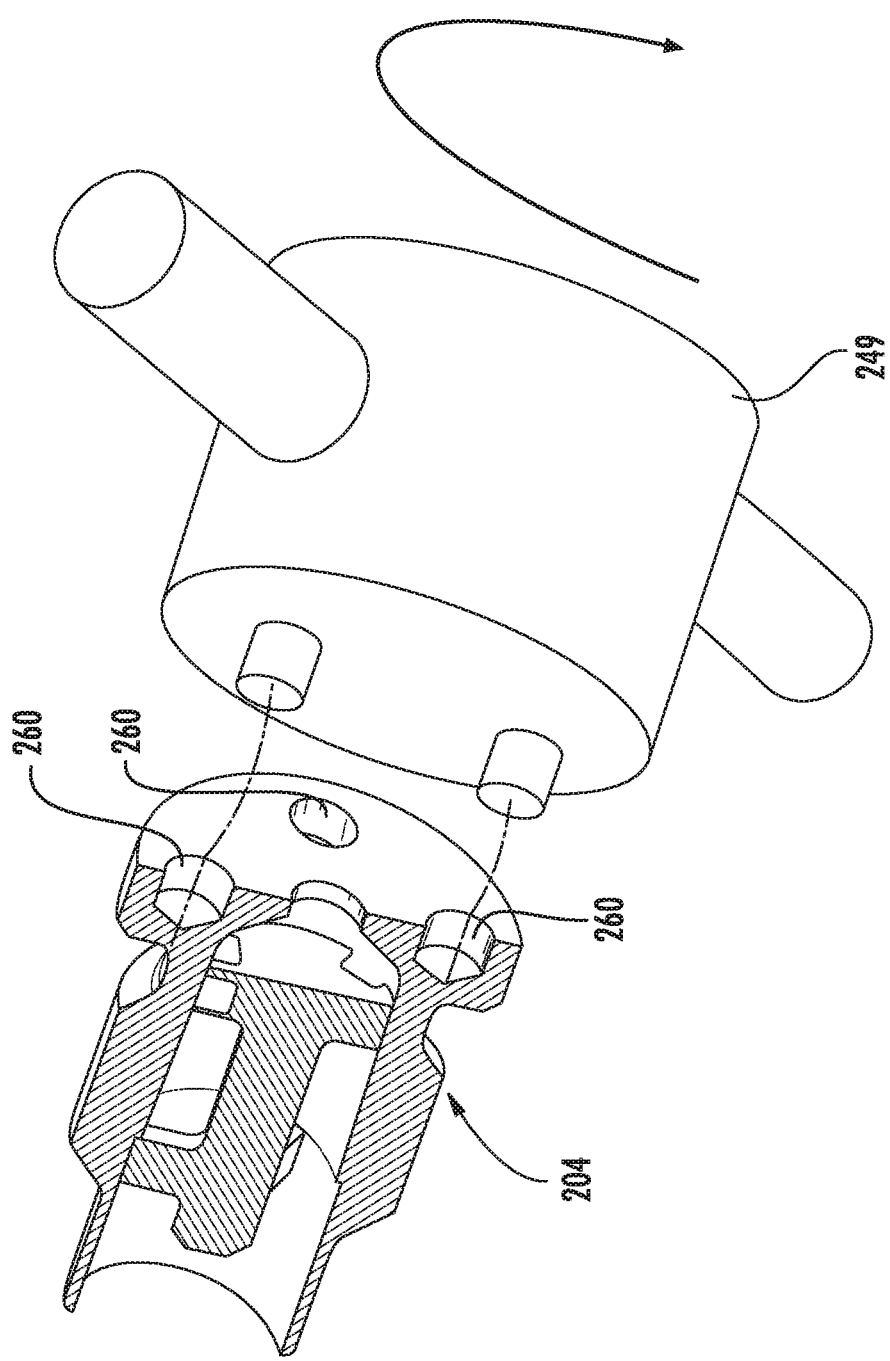
FIG. 7 is a perspective of an exemplary tool used to remove the liquid fuel injector.

In one embodiment, four small cylindrical wrenching pockets 260 are machined in an equidistant annular pattern into the face of the outer jacket 206 of the liquid fuel injector 204. The annular configuration allows the injectors orifice 216 to be positioned in the center of the fuel injector 204 without geometric interference. A tool 249 (see FIG. 7), such as a spanner wrench featuring "pegs", can be provided to interlock with the wrenching pockets 260 and enable rotation of the liquid fuel injector 204 thereby engaging the injector threaded surface 212 with the annular hub 130 threaded surface 236 and tightening to proper torque specifications. Removal of the liquid fuel injector 204 is also enabled by the wrenching pockets 260.

Typical 'hex nut' wrenching, such as Allen style, for installing and removing the liquid fuel injector 204 to the annular hub 130 would require too large of a clearance for sufficient wrenching access and also can result in unacceptable recirculation zones. Other style wrenching features interfere with orifice 216 behavior resulting in an unacceptable spray quality and/or unacceptable recirculation zone size.

To ensure an adequate hermetic seal is formed between the liquid fuel injector 204 and the hub 130, the first end 208 of the liquid fuel injector 204 may include a cylindrical sealing surface 240, and the second end 210 of the liquid fuel injector 204 may include a seating surface 242. The aperture 230 may include a conical seat 244 about the first end 232 that is configured to mate with the cylindrical sealing surface 240 of the liquid fuel injector 204 as the liquid fuel injector 204 is threaded into the aperture 230. In this manner, the cylindrical sealing surface 240 swages inward along the conical seat 244 to form a hermetic seal therebetween as the liquid fuel injector 204 is threaded into the aperture 230. The length, thickness, and/or angle of the cylindrical sealing surface 240 and/or the conical seat 244 may vary. The second end of the aperture 230 may include a seating surface 246 configured to mate with the seating surface 242 of the liquid fuel injector 204 as the liquid fuel injector 204 is threaded into the aperture 230. The seating surface 242 may set and/or limit the amount of engagement between the cylindrical sealing surface 240 and conical seat 244. The term swage means, among other things, forcing a component into a confined space so as to reduce the diameter of the component and create a seal therebetween.

The cylindrical sealing surface 240 and the corresponding conical seat 244 ensure an adequate hermetic seal between the liquid fuel injector 204 and the hub 130 without the installation of a separate sealing component. The sealing arrangement ensures that the fuel flows through the orifice 216 and not around the liquid fuel injector 204. The present arrangement eliminates the need for many hundreds of additional costly seals and allows a tighter packing of liquid fuel injectors 204 within the hub 130, resulting in lower emissions and better thermal protection. In addition, the sealing interface between the liquid fuel injector 204 and the hub 130 provides a much cleaner flow path for the liquid fuel. The flow path may be flushed clean after the circuit is turned off. The present arrangement also provides a thermal break 248 between the liquid fuel 202 on the wetted wall of the injector 204 housing and the annular hub 130. As seen in FIG. 4, the thermal break 248 prevents contact between the outer surface of the injector outer jacket 206 and the inner surface of the annular hub 130, everywhere except at the threaded surface 212 and where the sealing surface 240 contacts the conical seat 244. This helps to eliminate the formation of coke on the wetted walls of the liquid fuel injector 204.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A premixing fuel nozzle assembly for a turbomachine, comprising:
   an inner hub comprising an aperture, the aperture extending from a first end to a second end, the aperture comprising an internal threaded surface disposed between the first end and the second end and a conical seat defined at the first end;
   an outer shroud surrounding the inner hub;
   a premixing chamber defined between the inner hub and the outer shroud, the premixing chamber in communication with a flow of compressed air via an air inlet of the premixing fuel nozzle assembly and in communication with a flow of gaseous fuel via a fuel injection port, whereby the flow of compressed air and the flow of gaseous fuel mix in the premixing chamber to form a premixed flow downstream of the fuel injection port;
   a liquid fuel injector comprising an outer jacket, the outer jacket comprising a first end and a second end with an external threaded surface disposed therebetween, the first end of the outer jacket comprising a cylindrical sealing surface, the second end of the outer jacket comprising a seating surface and a downstream face of the liquid fuel injector, the downstream face of the liquid fuel injector in contact with the premixed flow, and a wrenching pocket extending from the downstream face of the liquid fuel injector, wherein the wrenching pocket is in fluid communication with the premixing chamber and in contact with the premixed flow;
   wherein the second end of the aperture comprises a seating surface positioned radially outward of the external threaded surface, the seating surface of the aperture configured to mate with the seating surface of the liquid fuel injector as the liquid fuel injector is threaded into the aperture; and
   wherein the cylindrical sealing surface of the liquid fuel injector is swaged inward to form a hermetic seal with the conical seat of the inner hub.

2. The fuel nozzle assembly of claim 1, wherein the wrenching pocket comprises a recessed cylindrical bore, a recessed oval bore, a recessed square bore, or combinations thereof.

3. The fuel nozzle assembly of claim 1, wherein the liquid fuel injector comprises an atomizing liquid fuel injector, a plain jet liquid fuel injector, a simple orifice liquid fuel injector, or combinations thereof.

4. The fuel nozzle assembly of claim 1, wherein the aperture is in communication with a liquid fuel passage.

5. The fuel nozzle assembly of claim 4, wherein the liquid fuel passage comprises a fuel plenum therein.

6. The fuel nozzle assembly of claim 5, wherein a thermal break is disposed between the liquid fuel passage and the liquid fuel injector.

7. The fuel nozzle assembly of claim 1, wherein the outer jacket comprises:
   an internal passageway between the first end and the second end thereof; and
   an orifice disposed about the second end thereof, wherein the orifice is narrower than the internal passageway.

8. The fuel nozzle assembly of claim 7, further comprising a swirler disposed within the internal passageway.

9. A turbomachine, comprising:
   a compressor;
   a combustor in communication with the compressor, the combustor comprising a premixing fuel nozzle assembly, the premixing fuel nozzle assembly comprising:
   an inner hub comprising an aperture, the aperture extending from a first end to a second end, the aperture comprising an internal threaded surface disposed between the first end and the second end and a conical seat defined at the first end;
   an outer shroud surrounding the inner hub;
   a premixing chamber defined between the inner hub and the outer shroud, the premixing chamber in communication with a flow of compressed air via an air inlet of the premixing fuel nozzle assembly and in communication with a flow of gaseous fuel via a fuel injection port, whereby the flow of compressed air and the flow of gaseous fuel mix in the premixing chamber to form a premixed flow downstream of the fuel injection port;
   a liquid fuel injector comprising an outer jacket, the outer jacket comprising a first end and a second end with an external threaded surface disposed therebetween, the first end of the outer jacket comprising a cylindrical sealing surface, the second end of the outer jacket comprising a seating surface and a downstream face of the liquid fuel injector, the downstream face of the liquid fuel injector in contact with the premixed flow, and a wrenching pocket extending from the downstream face of the liquid fuel injector, wherein the wrenching pocket is in fluid communication with the premixing chamber and in contact with the premixed flow;
   wherein the second end of the aperture comprises a seating surface positioned radially outward of the external threaded surface, the seating surface of the aperture configured to mate with the seating surface of the liquid fuel injector as the liquid fuel injector is threaded into the aperture; and
   wherein the cylindrical sealing surface of the liquid fuel injector is swaged inward to form a hermetic seal with the conical seat of the inner hub.

10. The turbomachine of claim 9, wherein the wrenching pocket comprises a recessed cylindrical bore, a recessed oval bore, a recessed square bore, or combinations thereof.

11. The turbomachine of claim 9, wherein the liquid fuel injector comprises an atomizing liquid fuel injector, a plain jet liquid fuel injector, a simple orifice liquid fuel injector, or combinations thereof.

12. The turbomachine of claim 9, wherein the aperture is in communication with a liquid fuel passage.

13. The turbomachine of claim 12, wherein the liquid fuel passage comprises a fuel plenum therein.

14. The turbomachine of claim 13, wherein a thermal break is disposed between the liquid fuel passage and the liquid fuel injector.

15. The turbomachine of claim 9, wherein the outer jacket comprises:
   an internal passageway between the first end and the second end thereof; and
   an orifice disposed about the second end thereof, wherein the orifice is narrower than the internal passageway.

16. The turbomachine of claim 15, further comprising a swirler disposed within the internal passageway.

* * * * *